(No Model.)

J. W. HOFFMAN.
GALVANIC BATTERY.

No. 484,096. Patented Oct. 11, 1892.

Witnesses
W. Middleton.
R. M. Wagner.

Inventor
John W. Hoffman
By Chas. G. Page
Atty.

UNITED STATES PATENT OFFICE.

JOHN W. HOFFMAN, OF CHICAGO, ILLINOIS.

GALVANIC BATTERY.

SPECIFICATION forming part of Letters Patent No. 484,096, dated October 11, 1892.

Application filed December 12, 1891. Serial No. 414,809. (No model.)

*To all whom it may concern:*

Be it known that I, JOHN W. HOFFMAN, a citizen of the United States, residing at Chicago, in the county of Cook and State of Illinois, have invented a certain new and useful Improvement in Galvanic Batteries, of which the following is a specification.

The object of my invention is to provide a simple, economical, and highly-efficient non-polarizing galvanic battery and to effectively prolong the life of the same.

To the attainment of the foregoing and other useful ends, I construct the battery with a zinc cup or cell, which constitutes the negative electrode, and provide the same with a lining composed of starch and an excitant, such as sal-ammoniac. Within the space which is walled by such lining I place a filling composed of crushed coke or carbon and a depolarizing agent, such as peroxide of manganese, in conjunction with an excitant, such as sal-ammoniac and water and preferably some glycerine. Within this filling I embed the positive electrode consisting of a stick or plate of carbon. This starch used can be either potato-starch or corn-starch; but it must be starch, in contradistinction to flour or other vegetable or mineral substances. The starch can be first cooked and the sal-ammoniac then added, or the sal-ammoniac can be first added to the starch and the compound then cooked, it being observed that the proportions should be such as to provide a cooked starch of sufficient consistency to form a plastic mass. By using a lining thus composed of starch and sal-ammoniac I find by experiment that less resistance is involved than in batteries contemplating the use of a compound consisting of sal-ammoniac, chloride of zinc, plaster, flour, and water, and, further, that the starch will not dry and harden, as will inevitably be the case where a compound such as herein last mentioned is used. Moreover, the starch will not sour. The crushed filling contains sufficient sal-ammoniac, water, and glycerine to moisten the granules and insure contact with the carbon stick or plate.

Figure 1:
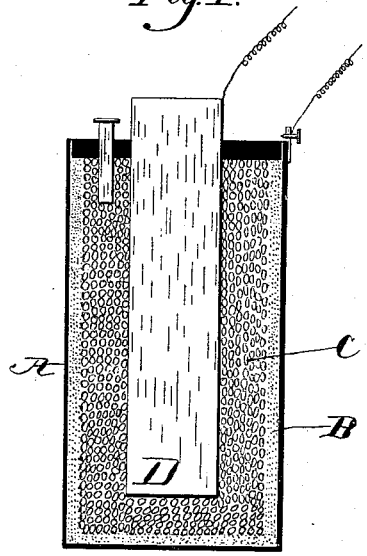
Figure 2:
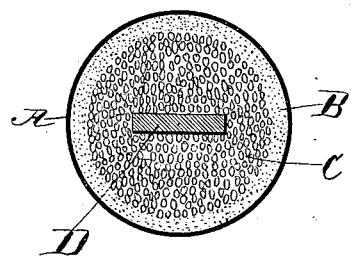

In the accompanying drawings, Figure 1 is a vertical section of the battery, and Fig. 2 a horizontal section.

A indicates the zinc cup or cell, and B the lining of starch and sal-ammoniac.

C indicates the filling of crushed coke or carbon, peroxide of manganese, water, and glycerine, and D denotes the carbon stick or plate, which is embedded in said filling.

While I do not confine myself to the following stated proportions, they are here given as a desirable formula, to wit: for the lining, one pint, or sixteen ounces, of water, three ounces of starch, and two ounces of sal-ammoniac; for the filling, eight ounces of peroxide of manganese, eight ounces of crushed coke or carbon, one ounce of glycerine, and three ounces of water.

What I claim as my invention is—

1. A galvanic battery comprising a zinc cup or cell provided with a plastic lining of starch and an excitant, a moistened filling of crushed coke or carbon and a depolarizing agent, and a carbon stick or plate embedded in said filling, substantially as described.

2. A galvanic battery comprising a zinc cup or cell provided with a plastic lining of starch and an excitant, a filling of crushed coke or carbon, crushed peroxide of manganese, and glycerine, and a carbon stick or plate embedded in said filling, substantially as described.

JOHN W. HOFFMAN.

Witnesses:
CHAS. G. PAGE,
RETA M. WAGNER.